(12) United States Patent
Yu et al.

(10) Patent No.: US 9,712,808 B2
(45) Date of Patent: Jul. 18, 2017

(54) IMAGE ACQUISITION DEVICE AND IMAGE PROCESSING METHOD AND SYSTEM

(71) Applicant: BOE Technology Group Co., Ltd., Beijing (CN)

(72) Inventors: Jing Yu, Beijing (CN); Xuewen Lv, Beijing (CN); Jibo Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 213 days.

(21) Appl. No.: 14/619,179

(22) Filed: Feb. 11, 2015

(65) Prior Publication Data
US 2016/0198144 A1 Jul. 7, 2016

(30) Foreign Application Priority Data

Jan. 5, 2015 (CN) .......................... 2015 1 0003857

(51) Int. Cl.
*H04N 13/00* (2006.01)
*H04N 13/02* (2006.01)

(52) U.S. Cl.
CPC ..... *H04N 13/0242* (2013.01); *H04N 13/0282* (2013.01); *H04N 2013/0081* (2013.01)

(58) Field of Classification Search
CPC ....................... H04N 13/0242; H04N 13/0282
USPC ......................................................... 348/139
See application file for complete search history.

(56) References Cited

U.S. PATENT DOCUMENTS

| 2002/0015048 | A1* | 2/2002 | Nister | ................. | G06T 7/0065 |
| | | | | | 345/625 |
| 2010/0195869 | A1* | 8/2010 | Geiss | ................. | G06K 9/00369 |
| | | | | | 382/103 |
| 2011/0267486 | A1 | 11/2011 | Kane et al. | | |
| 2015/0312445 | A1* | 10/2015 | Cha | ..................... | H04N 5/2226 |
| | | | | | 348/48 |

FOREIGN PATENT DOCUMENTS

| CN | 101350101 A | 1/2009 |
| CN | 101498889 A | 8/2009 |
| CN | 102065313 A | 5/2011 |
| CN | 102365859 A | 2/2012 |

(Continued)

OTHER PUBLICATIONS

Kauff et al: Depth map creation and image-based rendering for advanced 3DTV services providing interoperability and scalability:, Signal Processing. Image Communication, Elsevier Science Publishers, Amsterdam, NL, vol. 22, No. 2, Mar. 16, 2007 (Mar. 16, 2007), pp. 217-234, XP005938670, ISSN: 0923-5695, DOI:10. 1016.J.IMAGE.2006.11.03.*

(Continued)

*Primary Examiner* — Jeffery Williams
(74) *Attorney, Agent, or Firm* — Banner & Witcoff, Ltd.

(57) ABSTRACT

An image acquisition device and an image processing method and system are provided. The image acquisition device includes a first dual-camera device and a second dual-camera device. The first dual-camera device includes a first camera and a third camera. The second dual-camera device includes the first camera and a second camera. The image acquisition device can acquire depth information of richer information content from more viewing angles and reduce the number of points that cannot be matched.

8 Claims, 3 Drawing Sheets

(56) References Cited

FOREIGN PATENT DOCUMENTS

| CN | 103776419 A | 5/2014 |
|---|---|---|
| CN | 103913114 A | 7/2014 |
| CN | 103945210 A | 7/2014 |
| WO | 2014081115 A1 | 5/2014 |

OTHER PUBLICATIONS

Kauff et al: Depth map creation and image-based rendering for advanced 3DTV services providing interoperability and scalability:, Signal Processing. Image Communication, Elsevier Science Publishers, Amsterdam, NL, vol. 22, No. 2, Mar. 16, 2007 (Mar. 16, 2007), pp. 217-234, XP005938670, ISSN: 0923-5695, DOI: 10.1016.J.IMAGE.2006.11.03 *figures 4,11* *4; 4.5*.

Schreer O et al: 3D presence—A system concept for multi-user and multi-party immersive 3D video conferincing:, IET Conference Publications (IET 5th European Conference on Vidual Media Production), Nov. 26, 2009 (Nov. 26, 2008), pp. 1-8, XP009131444, *figure 7* *4.1*.

Cooke E et al: "Multiple narrow-baseline system for immersive teleconferencing", Video/Image Processing and Multimedia Communications 4th EURASIP—IEEE Region 8 International Symposium on Vipromcom Jun. 16-19, 2002, Piscataway, NJ USA, IEEE, Jun. 16, 2002 (Jun. 16, 2002), pp. 367-370, XP010598743, ISBN: 978-953-4011-01-5 * abstract *.

Jun. 1, 2016—(EP) European Search Report—App. No. 15155170.2.

Aug. 18, 2016—(CN)—Second Office Action Appn 201510003857.3 with English Tran.

Feb. 14, 2016—(CN)—First Office Action Appn 2015100038573 with English Tran.

Wei Hu, et al., "An Approach for Simultaneous Integration of Range Images in Binocular Stereo Vision", Journal of Computer-Aided Design and Computer Graphics, 11th issue, Nov. 15, 2008, pp. 1446-1451 and 1458.

* cited by examiner

IMAGE ACQUISITION DEVICE AND IMAGE PROCESSING METHOD AND SYSTEM

This application claims priority to Chinese Patent Application No. CN 201510003857.3 filed on Jan. 5, 2015. The present application claims priority to and the benefit of the above-identified application and is incorporated herein in its entirety.

TECHNICAL FIELD

At least one embodiment of the present disclosure relates to an image acquisition device, and an image processing method and system.

BACKGROUND

In recent years, stereo vision technology has gradually become a research focus in the field of computer vision technology and aims at acquiring depth images of an object through cameras. A depth image is an image reflecting the depth relationship of objects in a certain space, and in the image, pixel gray values represent the depth information in the space, namely the distance between points in the scene and the cameras. The depth image can be widely applied in three-dimensional reconstruction, collision detection, gesture recognition, robot navigation, design modeling for virtual scenes in movies and games, etc.

Currently, there are mainly two following methods to acquire a depth image. The first method is to acquire depth information of each point in the scene by direct observation via a measuring instrument (e.g., a camera with a function of measuring a distance). The second method is to acquire a depth image by calculation via a stereo matching method, and this method is to restore depth information of an object in a scene by the stereo matching of two parallax images of the same scene, acquired from two different viewpoints.

SUMMARY

At least one embodiment of the present disclosure provides an image acquisition device, which includes a first dual-camera device and a second dual-camera device. The first dual-camera device includes a first camera and a third camera. The second dual-camera device includes the first camera and a second camera.

At least one embodiment of the present disclosure provides an image processing method. The method includes: acquiring a first depth image of a predetermined scene via a first dual-camera device and acquiring a second depth image of the predetermined scene via a second dual-camera device; and fusing the first depth image and the second depth image to acquire a target depth image. In the method, the first dual-camera device includes a first camera and a third camera, and the second dual-camera device includes the first camera and a second camera.

At least one embodiment of the present disclosure provides an image processing system, which includes the above-mentioned image acquisition device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
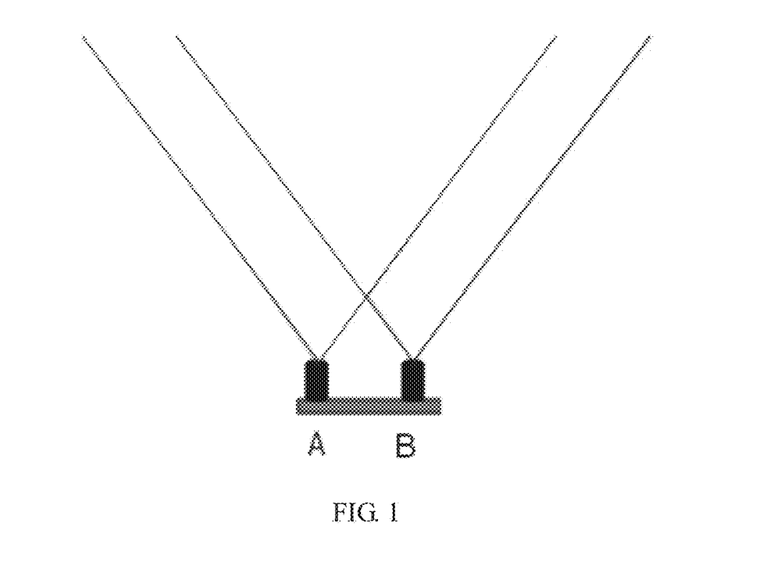
FIG. 1 is a schematic structural view of an image acquisition device of a binocular vision system.

FIG. 1 is a schematic structural view of an image acquisition device of a binocular vision system. As illustrated in FIG. 1, the image acquisition device generally includes two cameras A and B. The two cameras A and B are configured to capture the same scene so as to acquire two images from different viewing angles, and hence the two cameras A and B are combined into a dual-camera device. The binocular vision system adopts a stereo matching method, processes the acquired two images according to the relationship between positions of the same object on the images acquired by the two cameras and the distance between the cameras, and hence acquires a depth image of the scene.

The inventor of the application found that: when stereo matching is performed to two images acquired from different viewing angles, the situation in which a point in one image cannot be matched to a point in the other image may occur, namely the image captured by only one camera provides information to a pixel, the image captured by the other camera does not provide corresponding information, in this case, the two images cannot be fused at a position corresponding to the pixel, and this reduces the amount of information in the depth image after fusion, and brings a black informationless area to the depth image. There are mainly two reasons for causing the point that cannot be matched: one is that a point of an object in a certain space is not disposed within the common visual field, and hence the corresponding pixel of the point is provided only in the image captured by one camera; and the other is that even if the point of the object in the space is disposed within the common visual field, it may also occur that a corresponding pixel of the point is provided in the image captured by one camera but is not provided in the image captured by the other camera because the point is hidden by another object.

In order to reduce the number of the points that cannot be matched, the distance between the cameras in the binocular vision system can be reduced to expand the common visual field. In addition, the reduction of the distance between the cameras can further improve the short-distance depth measurement accuracy may, but can also reduce the long-distance depth measurement accuracy. Conversely, the increase of the distance between the cameras can improve the long-distance depth measurement accuracy, but the common visual field but reduce the short-distance depth measurement accuracy accordingly.

At least one embodiment of the present disclosure provides an image acquisition device and an image processing method and system. The image acquisition device includes a first dual-camera device and a second dual-camera device, the first dual-camera device includes a first camera and a third camera, and the second dual-camera device includes the first camera and a second camera. The image processing method includes: acquiring a first depth image of a predetermined scene via the above-mentioned first dual-camera device and acquiring a second depth image of the predetermined scene via the above-mentioned second dual-camera device; and fusing the first depth image and the second depth image to acquire a target depth image. In the embodiment of the present disclosure, two dual-camera devices sharing one camera are provided in the same system by adding the third camera on the basis of the first camera and the second camera in the binocular vision system; two depth images are acquired via the two dual-camera devices; and the two depth images are fused to acquire a target depth image. Because the target depth image includes the depth information acquired via the two dual-camera devices, compared with the case of acquiring the depth information via one dual-camera device in the binocular vision system, the embodiment of the present disclosure can acquire more depth information from more viewing angles, this is equivalent to expanding the common visual field of the cameras, and the number of the points that cannot be matched is reduced. Moreover, compared with the binocular vision system, the embodiment of the present disclosure can improve the short-distance recognition accuracy or the long-distance recognition accuracy.

Description will be given in the following embodiments by taking the case that the first camera and the second camera respectively correspond to the camera A and the camera B in the image acquisition device shown in FIG. 1 as an example.

Figure 2:
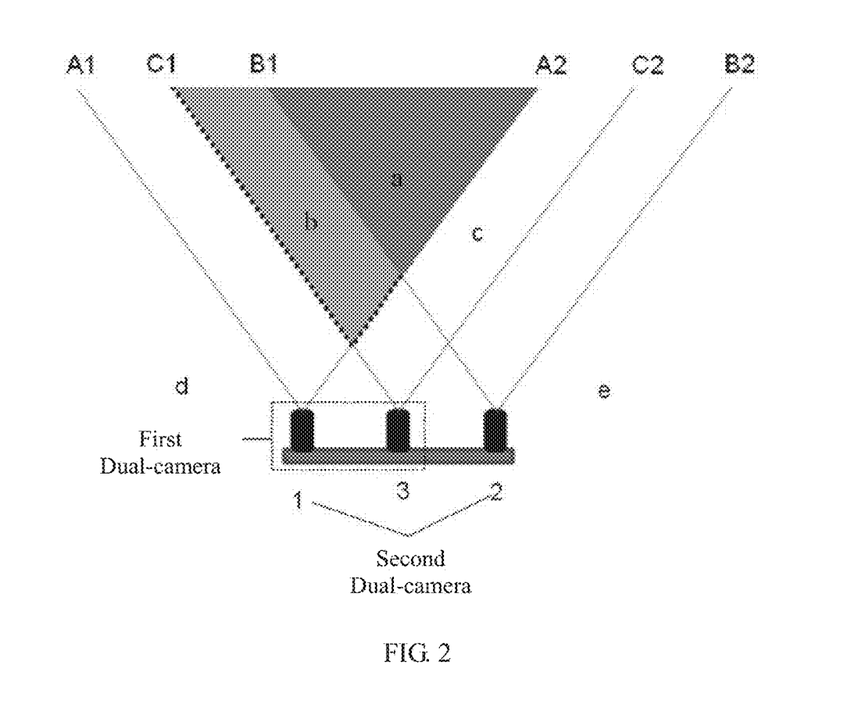
FIG. 2 is a schematic structural view of an image acquisition device provided by an embodiment of the present disclosure.

As illustrated in FIG. 2, the image acquisition device provided by at least one embodiment of the present disclosure includes a first dual-camera device and a second dual-camera device. The first dual-camera device includes a first camera 1 and a third camera 3. The second dual-camera device includes the first camera 1 and a second camera 2. For instance, any one of the above-mentioned cameras can adopt an image sensor such as a charge-coupled device (CCD) and a complementary metal oxide semiconductor (CMOS) device.

In FIG. 2, an area defined by A1 and A2 represents the coverage of the first camera 1; an area defined by B1 and B2 represents the coverage of the second camera 2; and an area defined by C1 and C2 represents the coverage of the third camera 3.

As seen from FIG. 2, when only the first camera 1 and the second camera 2 are provided, the common visual field refers to an area a defined by the straight line B1 and the straight line A2. Thus, the depth image, acquired by the image acquisition device shown in FIG. 1, includes the depth information of the scene within the area a.

After the third camera 3 is added, a first depth image acquired by the first dual-camera device is an image obtained by fusing images acquired by the first camera 1 and the third camera 3. Thus, the depth image includes the depth information of the scene within the area defined by the straight line C1 and the straight line A2. Similarly, a second depth image acquired by the second dual-camera device includes the depth information of the scene within the area defined by the straight line B1 and the straight line A2. When the first depth image and the second depth image are fused, if only one of the depth images provides depth information to a pixel (for example, the pixel corresponds to a point of an object in a scene), the pixel with the depth information in the depth image is taken as the pixel after fusion. For instance, in short-distance measurement, a pixel may be provided with depth information in the first depth image acquired by the first dual-camera device and be provided with no corresponding depth information in the second depth image acquired by the second dual-camera device. For instance, in long-distance measurement, a pixel may be provided with depth information in the second depth image acquired by the second dual-camera device and be provided with no corresponding depth information in the first depth image acquired by the first dual-camera device. In this case, a target depth image obtained by fusing the first depth image and the second depth image includes the depth information of the scene within the area defined by the straight line C1 and the straight line A2 (namely the area a and an area b defined by the straight lines C1, A2 and B1). It can be seen from this that: compared with the image acquisition device shown in FIG. 1, the image acquisition device provided by the embodiments of the present disclosure can capture the scene from more viewing angles to acquire two depth images; and the target depth image obtained after image fusion processing has the depth information of the scene within the area b, this is equivalent to expanding the common visual field of the cameras and hence reduces the number of unmatched points.

For instance, in the image acquisition device shown in FIG. 2, the distance between the two cameras 1 and 3 in the first dual-camera device is 6 cm, and the distance between the two cameras 1 and 2 in the second dual-camera device is 12 cm. As seen from FIG. 2, the smaller the distance between the cameras, the wider the common visual field.

Figure 3:
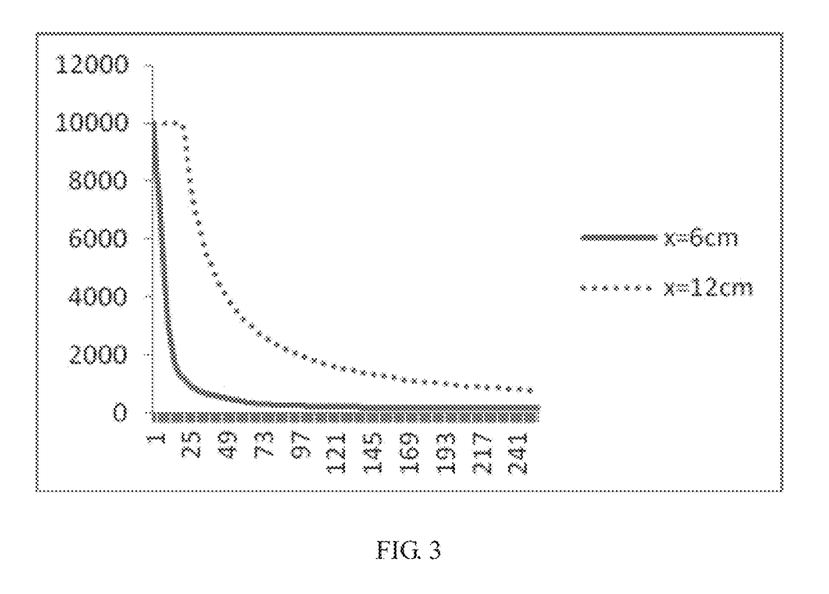
FIG. 3 is a comparison diagram illustrating relationship between a recognition distance and an accuracy quantized value, provided by an embodiment of the present disclosure.

FIG. 3 is a comparison diagram illustrating a relationship between the recognition distance (the vertical axis) and the accuracy quantized value (the horizontal axis) when the distance (x) between the cameras is respectively 6 cm and 12 cm. When the recognition distance is about 0 to 75 cm, only the first dual-camera device has accuracy quantized values, namely only the first dual-camera device can perform depth recognition on an object within the range. When the recognition distance is greater than 75 cm, both the first dual-camera device and the second dual-camera device have accuracy quantized values, and the recognition accuracy of the second dual-camera device is higher as for an object with the same recognition distance. It can be seen from FIG. 3 that when the distance between the cameras is larger, the long-distance measurement accuracy is higher, and hence the cameras are more applied to long-distance depth measurement.

Therefore, in FIG. 2, the common visual field of the first dual-camera device is greater than that of the second dual-camera device, so the first dual-camera device can be applied to short-distance depth measurement; and the long-distance depth measurement accuracy of the second dual-camera device is superior to that of the first dual-camera device, so the second dual-camera device can be applied to long-distance depth measurement. In this way, compared with the image acquisition device shown in FIG. 1, the image acquisition device shown in FIG. 2 expands the common visual field and improves the short-distance depth measurement accuracy, and in the meantime, does not reduce the long-distance depth measurement accuracy.

In FIG. 2, the third camera 3 is disposed in an area between the first camera 1 and the second camera 2. Thus, the distance between the camera 1 and 2 is greater than the distance between the cameras 1 and 3 or the distance between the cameras 2 and 3. The first camera 1 is shared, so a dual-camera device with a maximum distance between the cameras can be obtained, and hence a long-distance depth measurement accuracy as high as possible can be obtained when the common visual field is expanded.

Of course, embodiments of the present disclosure do not limit the sequence for the first camera, the second camera and the third camera.

For instance, the serial numbers of the cameras in FIG. 2 may be respectively 3, 1 and 2 from left to right. In this case, the third camera 3 is disposed on one side of the first camera 1, away from the second camera 2, (namely an area d on the left-hand side of the first camera 1 in FIG. 2). In this case, because the first camera 1 is shared, the common visual field includes areas a, b and c. Compared with the image acquisition device shown in FIG. 1, by adding the third camera 3, the image acquisition device can expand the common visual field and improve the long-distance depth measurement accuracy, but does not reduce the short-distance depth measurement accuracy. It is to be noted that: in this case, if the third camera 3 and the second camera 2 respectively correspond to the camera A and the camera B in the image acquisition device shown in FIG. 1, which is equivalent to add the first camera on the basis of the case shown in FIG. 1 and allow the two dual-camera devices to share the first camera 1, the common visual field can be expanded and the short-distance depth measurement accuracy can be improved.

When the third camera 3 and the second camera 2 respectively correspond to the camera A and the camera B in the image acquisition device shown in FIG. 1 and the first camera 1 is disposed at a midpoint of a connecting line between the second camera 2 and the third camera 3, because the first camera is shared, the distance between the two cameras of the first dual-camera device is the same with the distance between the two cameras of the second dual-camera device. Although the common visual field can be expanded and the short-distance depth measurement accuracy can be improved, the long-distance depth measurement accuracy is relatively smaller. In view of this, in order to allow the image acquisition device provided by the embodiment of the present disclosure to include a dual-camera device applicable for short-distance depth measurement and a dual-camera device applicable for long-distance depth measurement simultaneously and include the dual-camera devices with different common visual fields, in at least one embodiment of the present disclosure, the distance between the two cameras in the first dual-camera device may be smaller than the distance between the two cameras in the second dual-camera device.

Figure 4:
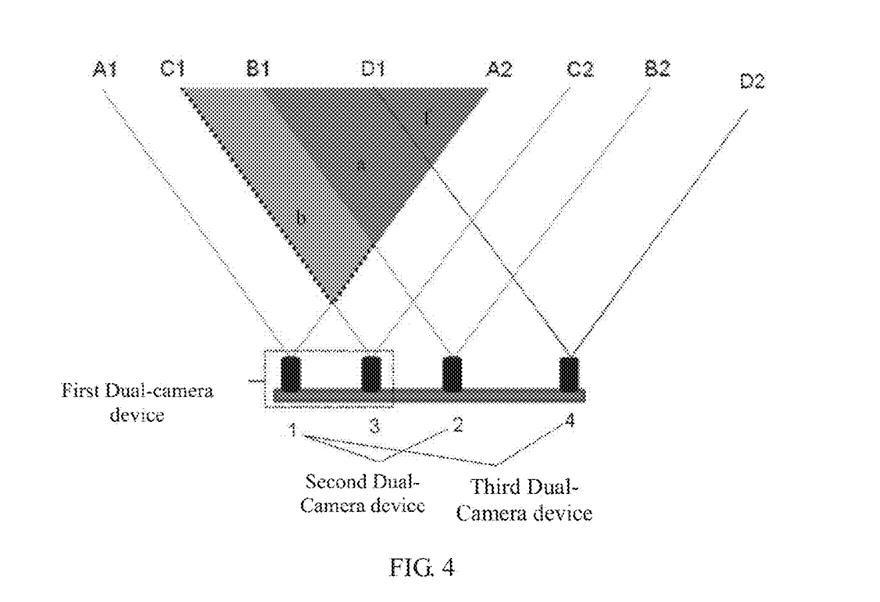
FIG. 4 is a schematic structural view of an image acquisition device provided by another embodiment of the present disclosure.

In addition, according to actual condition, in at least one embodiment, the image acquisition device may further include a third dual-camera device. The third dual-camera device includes the first camera and a fourth camera. The fourth camera and the second camera or the third camera are in a same straight line or in different straight lines. For instance, as illustrated in FIG. 4, the fourth camera 4 may be disposed on one side of the second camera 2, away from the first camera 1, on the basis of the case shown in FIG. 2 (namely an area e on the right-hand side of the second camera 2 in FIG. 2), and be in a same straight line with the second camera 2. Compared with the image acquisition device shown in FIG. 1, this can expand the common visual field and improve the short-distance depth measurement accuracy and the long-distance depth measurement accuracy simultaneously. The embodiment of the present disclosure does not limit the position of the fourth means.

For instance, the image acquisition device provided by at least one embodiment of the present disclosure may further include a trigger switch. The trigger switch is connected with the above-mentioned cameras. The cameras can capture a predetermined scene via the control for the trigger switch.

It is to be noted that: the embodiment of the present disclosure is not limited to the cases shown in FIGS. 2 and 4; more dual-camera devices can be provided by adding more cameras, so that the information of the scene can be obtained from more viewing angles, and hence more depth information can be obtained; and the dual-camera devices, for instance, share one camera. Of course, in view of reducing the costs and reducing the image processing difficulty, the number of the cameras is not the more the better. It can be understood that those skilled in the art can select the number and the setting position of the cameras according to actual condition to form a plurality of dual-camera devices.

For instance, the image acquisition device provided by at least one embodiment of the present disclosure may further include a memory device. The memory device, for instance, may be a flash memory, a random access memory (RAM), an erasable programmable read only memory (EPROM), etc.

Figure 5:
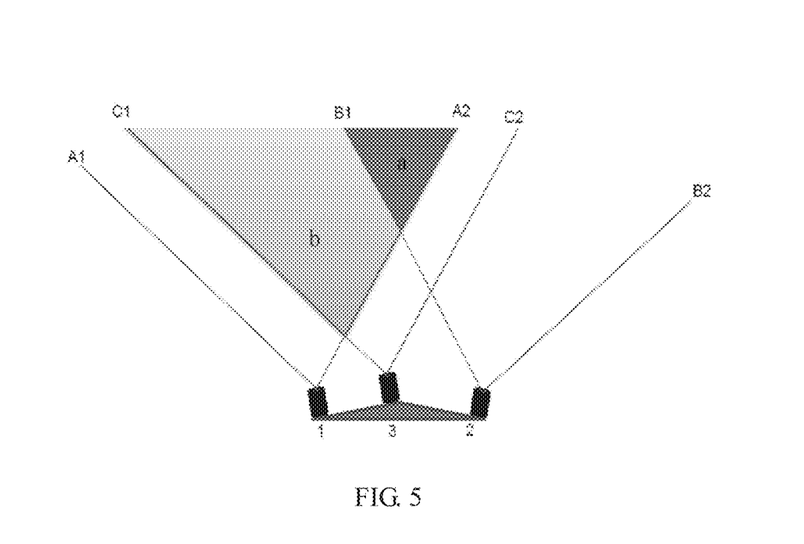
FIG. 5 is a schematic structural view of an image acquisition device provided by still another embodiment of the present disclosure.

FIG. 2 illustrates the case that the third camera 3 is disposed in a connecting line between the first camera 1 and the second camera 2. But embodiments of the present disclosure are not limited thereto. It can be understood that: as illustrated in FIG. 5, when the third camera 3 is disposed at a position that is not in the connecting line, although, in this case, the short-distance depth measurement accuracy of the image acquisition device may be reduced to some extent, compared with the case that the third camera 3 is disposed in the connecting line, the embodiment of the present disclosure can still obtain depth information with larger amount of information from more viewing angles and expand the common visual field of the cameras. In addition, the means of disposing the third camera at a position that is not in the connecting line is applicable to the case that a camera is added under a condition of a relatively small and limited distance between the cameras. Thus, in at least one embodiment, the first camera 1, the second camera 2 and the third camera 3 may be in a same straight line or in different straight lines.

Figure 6:
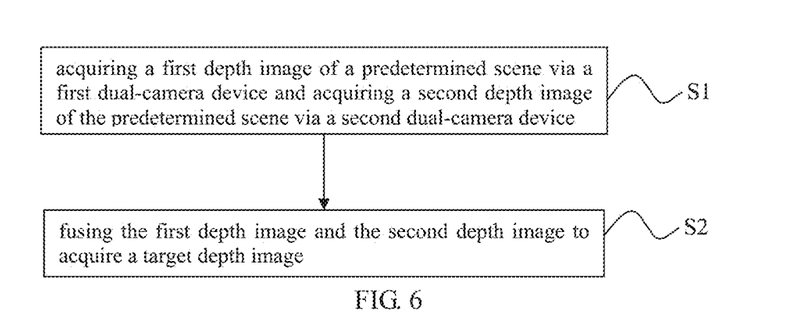
FIG. 6 is a flowchart of an image processing method provided by an embodiment of the present disclosure.

As illustrated in FIG. 6, at least one embodiment of the present disclosure provides an image processing method. The method includes: step S1: acquiring a first depth image of a predetermined scene via a first dual-camera device and acquiring a second depth image of the predetermined scene via a second dual-camera device, in which step, the first dual-camera device includes a first camera and a third camera, and the second dual-camera device includes the first camera and a second camera; and step S2: fusing the first depth image and the second depth image to acquire a target depth image by.

In the step S1, as illustrated in FIG. 2, the first dual-camera device includes a first camera 1 and a third camera 3, and the second dual-camera device includes the first camera 1 and a second camera 2. The first camera 1 and the third camera 3 in the first dual-camera device may capture a same scene so as to acquire images of the scene from two viewing angles, and the first depth image can be obtained by fusing the two images via the stereo matching method commonly used in the field. Thus, the first depth image includes depth information of the scene within an area defined by straight lines C1 and A2. Similarly, the first camera 1 and the second camera 2 in the second dual-camera device capture the same scene, and the second depth image can be obtained after image fusion. The second depth image includes depth information of the scene within an area defined by straight lines B1 and A2.

In the step S2, because the first dual-camera device and the second dual-camera device share the same camera (the first camera 1), the first depth image and the second depth image can be fused to obtain a target depth image. In fusing the first depth image and the second depth image, when only one of the depth images provides depth information to a pixel (for example, the pixel corresponds to a point of an object in the predetermined scene), the pixel with the depth information in the depth image is taken as the pixel after fusion (for example, the pixel after fusion refers to a corresponding pixel in the target depth image). Thus, the target depth image includes depth information of the scene within an area defined by straight lines C1 and A2 (namely areas a and b), namely the depth information in the target depth image is the sum of the depth information in the first depth image and the depth information in the second depth image. Compared with the depth image acquired by the image acquisition device shown in FIG. 1, in the embodiment of the present disclosure, the depth information of the scene within the area b is added, and this is equivalent to expanding the common visual field of the cameras and reduces the number of points that cannot be matched.

In the step S2, information in the first depth image and the second depth image may be fused based on pixels (for example, the pixels correspond to points of an object in the predetermined scene). The following cases may occur in fusion.

Case 1: only one of the depth images provides depth information to a first pixel. In this case, the corresponding pixel in the depth image is taken as the first pixel after fusion.

For instance, in short-distance measurement, a pixel may be provided with depth information in the first depth image acquired by the first dual-camera device shown in FIG. 2 and be provided with no corresponding depth information in the second depth image acquired by the second dual-camera device, and in this case, the pixel with the depth information in the first depth image is taken as the pixel after fusion. For instance, in long-distance measurement, a pixel may be provided with depth information in the second depth image acquired by the second dual-camera device and be provided with no corresponding depth information in the first depth image acquired by the first dual-camera device, and in this case, the pixel with the depth information in the second depth image is taken as the pixel after fusion.

Case 2: both of the depth images provide depth information to a second pixel. In this case, the corresponding pixel in either of the depth images including the depth information may be taken as the second pixel after fusion.

As seen from the comparison diagram illustrating the relationship between the recognition distance (the vertical axis) and the accuracy quantized value (the horizontal axis) shown in FIG. 3, the larger the distance between the cameras, the higher the long-distance measurement accuracy. For instance, as for the image acquisition device shown in FIG. 2, when a pixel is provided with depth information in both of the first depth image acquired by the first dual-camera device and the second depth image acquired by the second dual-camera device, because the distance between the two cameras in the first dual-camera device is smaller than the distance between the two cameras in the second dual-camera device, a corresponding pixel in the second depth image is taken as the pixel after fusion. Compared with the depth image acquired via the image acquisition device shown in FIG. 1, a long-distance depth measurement accuracy as large as possible can be obtained. Thus, the dual-camera devices can have different common visual fields, and hence more depth information can be obtained. Moreover, the depth images acquired by the dual-camera devices may have depth measurement accuracy of different distances.

Case 3: neither of the depth images provides depth information to a pixel. In this case, the pixel is not processed.

In at least one embodiment, the image processing method may further include: acquiring a third depth image of the predetermined scene via a third dual-camera device; and fusing the first depth image, the second depth image and the third depth image to acquire the target depth image. Moreover, the third dual-camera device includes the first camera and a fourth camera. The fourth camera and the second camera or the third camera may be in a same straight line or in different straight lines. For instance, the fourth camera 4 may be disposed on one side of the second camera 2 away from the first camera 1 on the basis of the case shown in FIG. 2 (namely the area e on the right-hand side of the second camera 2 in FIG. 2), and be in a same straight line with the second camera 2, as illustrated in FIG. 4. The common visual field of the first camera 1 and the fourth camera 4 includes an area f defined by straight lines D1 and A2. In this case, the target depth image includes information of the scene within areas b, a and f. Moreover, in the case 2, a certain pixel may be provided with depth information in at least two depth images according to the common visual field of the cameras of the dual-camera devices. For instance, a pixel corresponding to a point of an object in the area a may be provided with depth information in the two depth images, namely the first depth image and the second depth image. For instance, a pixel corresponding to a point of an object in the area f may be provided with depth information in all the three depth images, namely the first depth image, the second depth image and the third depth image.

The depth image acquired by the above-mentioned method is the depth image outputted by the image acquisition device provided by the embodiment of the present disclosure. As seen from above, the depth information in the depth image is the sum of the depth information in the depth images acquired by the dual-camera devices. Thus, the image processing method provided by the embodiment of the present disclosure can obtain depth information with a larger amount of information, and this is equivalent to expanding the common visual field of the cameras and reduces the number of points that cannot be matched. Moreover, embodiments of the present disclosure can improve the short-distance recognition accuracy or the long-distance recognition accuracy.

It is to be noted that the image processing method provided by the embodiments of the present disclosure may also acquire the target depth image with richer information content by obtaining and fusing more depth images. Of course, in view of reducing the costs and reducing the image processing difficulty, the number of the depth images (positively correlated to the number of the cameras) is not the more the better. It can be understood that design can be made by those skilled in the art according to actual condition. Moreover, description is given in the embodiments of the present disclosure only by taking the cases shown in FIGS. 2 and 4 as an example. The sequence of the first camera, the second camera, the third camera and the fourth camera is not limited.

Figure 7:
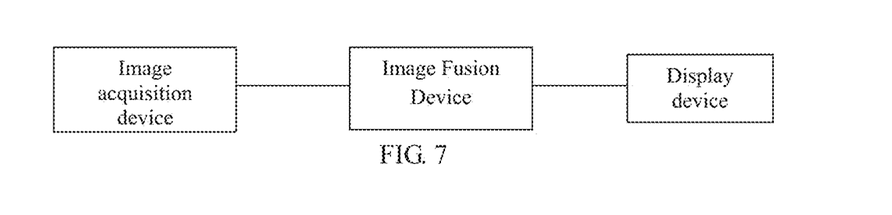
FIG. 7 is a block diagram of an image processing system provided by an embodiment of the present disclosure.

At least one embodiment of the present disclosure further provides an image processing system, which includes the image acquisition device provided by any one of the above-mentioned embodiments, as illustrated in FIG. 7.

In an embodiment, the image processing system further includes an image fusion device which is configured for fusing depth images of a same scene acquired by the dual-camera devices of the image acquisition device to obtain a target depth image. The image fusion device, for instance, may be implemented via a general computing device (e.g., a central processing unit (CPU)), a special computing device (e.g., a digital signal processor (DSP)) and the like. Detailed descriptions will be omitted herein.

Image fusion refers to the case that image data of the same target acquired by multi-source channels is processed through image processing technology, computer technology and so on, so as to maximally acquire favorable information in respective information channels and finally integrate the information into a high-quality image. The image fusion device in the embodiment of the present disclosure is a device adopting the image fusion technology, for instance, may be a chip based on the image processing method provided by the embodiments of the present disclosure, and two or more than two depth images may be fused via the chip by computer technology.

For instance, when the image acquisition device includes two dual-camera devices, the image fusion device may be configured for fusing the two depth images of the same scene acquired by the two dual-camera devices to obtain the target depth image. For instance, when the image acquisition device includes three or more than three dual-camera devices, the image fusion device may be configured for fusing three or more than three depth images of the same scene acquired by the dual-camera devices to obtain the target depth image.

The image fusion device provided by the embodiments of the present disclosure can fuse at least two depth images acquired by the image acquisition device to obtain the target depth image with richer information content. It is to be noted that: in view of reducing the costs and reducing the image processing difficulty, the number of the depth images (positively correlated to the number of the cameras) is not the more the better. It can be understood that design can be made by those skilled in the art according to actual condition.

In at least one embodiment, the image processing system may further include a display device. The display device is, for instance, a liquid crystal display (LCD), an organic light-emitting diode (OLED) display and the like, and is configured to display the target depth image.

The implementation of the image processing system provided by the embodiment of the present disclosure may refer to the embodiments of the image acquisition device and the image processing method. Repeated description will be omitted herein.

What are described above is related to the illustrative embodiments of the disclosure only and not limitative to the scope of the disclosure; the scopes of the disclosure are defined by the accompanying claims.

What is claimed is:

1. An image processing method, comprising:
   acquiring a first depth image of a predetermined scene via a first dual-camera device;
   acquiring a second depth image of the predetermined scene via a second dual-camera device; and
   fusing the first depth image and the second depth image to acquire a target depth image,
   wherein the first dual-camera device comprises a first camera and a third camera; and the second dual-camera device comprises the first camera and a second camera,
   the third camera is disposed in an area between the first camera and the second camera,
   the first depth image and the second depth image are fused based on pixels,
   in a case that only one depth image, of the first depth image and the second depth image, provides depth information to a first pixel, a corresponding pixel in the one depth image is taken as the first pixel after fusion;
   in a case that both of the first and second depth images provide depth information to a second pixel and a distance between the first and third cameras of the first dual-camera device is smaller than a distance between the first and second cameras of the second dual-camera device, a corresponding pixel in the second depth image is taken as the second pixel after fusion; and
   in a case that neither of the first and second depth images provides depth information to a third pixel, the third pixel is not processed.

2. The image processing method according to claim 1, further comprising:
   acquiring a third depth image of the predetermined scene via a third dual-camera device; and
   fusing the first depth image, the second depth image and the third depth image to acquire the target depth image,
   wherein the third dual-camera device comprises the first camera and a fourth camera.

3. An image processing system, comprising an image acquisition device and an image fusion device, the image acquisition device comprising a first dual-camera device for acquiring a first depth image and a second dual-camera device for acquiring a second depth image, and the image fusion device configured for fusing the first depth image and the second depth image to acquire a target depth image, wherein the first dual-camera device comprises a first camera and a third camera; and the second dual-camera device comprises the first camera and a second camera, the third camera is disposed in an area between the first camera and the second camera, the first depth image and the second depth image are fused based on pixels, in a case that only one depth image, of the first depth image and the second depth image, provides depth information to a first pixel, a corresponding pixel in the one depth image is taken as the first pixel after fusion;

in a case that both of the first and second depth images provide depth information to a second pixel and a distance between the first and third cameras of the first dual-camera device is smaller than a distance between the first and second cameras of the second dual-camera device, a corresponding pixel in the second depth image is taken as the second pixel after fusion; and in a case that neither of the first and second depth images provides depth information to a third pixel, the third pixel is not processed.

4. The image processing system according to claim 3, wherein the image fusion device is configured for fusing depth images of a same scene, acquired via the first dual-camera device and the second dual-camera device, to acquire a target depth image.

5. The image processing system according to claim 3, further comprising a display device configured to display a target depth image.

6. The image processing system according to claim 3, wherein the first camera, the second camera and the third camera are in a same straight line.

7. The image processing system according to claim 3, further comprising a third dual-camera device, wherein the third dual-camera device comprises the first camera and a fourth camera.

8. The image processing system according to claim 7, wherein the fourth camera and the second camera or the third camera are in a same straight line.

* * * * *